United States Patent
Takahashi et al.

(10) Patent No.: US 7,512,324 B2
(45) Date of Patent: Mar. 31, 2009

(54) DATA RECORDING APPARATUS, REPRODUCTION APPARATUS, RECORDING/REPRODUCTION METHOD, AND IMAGING APPARATUS

(75) Inventors: Masaru Takahashi, Yokohama (JP); Yasuo Mutsuro, Yokohama (JP); Keisuke Inata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 971 days.

(21) Appl. No.: 10/150,241

(22) Filed: May 15, 2002

(65) Prior Publication Data

US 2003/0133542 A1    Jul. 17, 2003

(30) Foreign Application Priority Data

Jan. 11, 2002    (JP)    ............... 2002-004051

(51) Int. Cl.
*H04N 7/26*    (2006.01)
(52) U.S. Cl. .................. 386/112; 386/111; 386/27; 386/33
(58) Field of Classification Search ......... 386/111–112, 386/27
See application file for complete search history.

(56) References Cited

U.S. PATENT DOCUMENTS

| | | | | |
|---|---|---|---|---|
| 4,001,885 | A * | 1/1977 | Ikushima ................ | 360/70 |
| 6,124,943 | A * | 9/2000 | Mitani .................... | 358/1.17 |
| 6,404,713 | B1 * | 6/2002 | Ueki ....................... | 369/47.53 |
| 6,516,397 | B2 * | 2/2003 | Roy et al. ............... | 711/170 |
| 6,549,578 | B1 * | 4/2003 | Maruya et al. ......... | 375/240.23 |
| 6,950,128 | B1 * | 9/2005 | Sawada ................... | 348/231.3 |
| 7,012,640 | B2 * | 3/2006 | Hayashi ................. | 348/231.99 |
| 7,433,916 | B2 * | 10/2008 | Satomi et al. .......... | 709/203 |
| 2001/0038642 | A1 * | 11/2001 | Alvarez et al. ......... | 370/477 |
| 2005/0180731 | A1 * | 8/2005 | Suzuki et al. .......... | 386/65 |

FOREIGN PATENT DOCUMENTS

| | | |
|---|---|---|
| JP | 8-307811 | 11/1996 |
| JP | 10-285597 | 10/1998 |
| JP | 11-146246 | 5/1999 |
| JP | 2000-197058 | 7/2000 |
| JP | 2000-333166 | 11/2000 |
| JP | 2001-126389 A | 5/2001 |

* cited by examiner

*Primary Examiner*—Thai Tran
*Assistant Examiner*—Helen Shibru
(74) *Attorney, Agent, or Firm*—Townsend and Townsend and Crew LLP (57) ABSTRACT

The present invention provides a recording/reproduction apparatus and a method therefor with superior cost-effectiveness and data durability with respect to vibrations, and an efficient configuration of the memory for storing data for recording/reproduction processing when compressing image data or the like and recording the data to a recording medium or reproducing the data therefrom. In the present invention, the memory for compression and expansion processing and the buffer memory for recording and reproduction are allocated to the same memory chip. When recording/reproduction becomes impossible because of vibrations or the like, the capacity of the buffer memory for recording/reproduction is maximized by expansion. The memory capacity for compression/expansion processing is modified according to the required image quality.

20 Claims, 5 Drawing Sheets

DATA RECORDING APPARATUS, REPRODUCTION APPARATUS, RECORDING/REPRODUCTION METHOD, AND IMAGING APPARATUS

CROSS-REFERENCES TO RELATED APPLICATIONS

Not Applicable

STATEMENT AS TO RIGHTS TO INVENTIONS MADE UNDER FEDERALLY SPONSORED RESEARCH OR DEVELOPMENT

Not Applicable

REFERENCE TO A "SEQUENCE LISTING," A TABLE, OR A COMPUTER PROGRAM LISTING APPENDIX SUBMITTED ON A COMPACT DISK

Not Applicable

BACKGROUND OF THE INVENTION

1. Field of the Invention

The present invention relates to an optimal configuration for a compression/expansion processing memory and recording/reproduction buffer memory associated with a recording apparatus or a reproduction apparatus that compresses data, and records the data on a recording medium, and that can reproduce and expand data from the recording medium. The present invention further provides a method for carrying out such operations.

2. Description of the Related Art

Apparatus for compressing and recording data to a recording medium include audio recorders, electronic still cameras, and video cameras. Because these devices are small, light, and can record information for a long period of time, they are becoming widely disseminated.

A problem with portable devices is that the devices become unable to record to or reproduce from a recording medium because of vibration or the like. Use of a recording medium which requires tracking control, such as a hard disk drive or optical disc as the recording medium, is particularly affected: tracking is thrown off due to vibrations and the device easily enters a state where recording and reproduction are not possible. One approach for resolving this problem is disclosed in Japanese Patent Laid-open Publication No. H08-307811, wherein recording data are temporarily placed in memory, and then read from memory and recorded to the recording medium. When vibrations are detected, the reading from memory and recording to the recording medium are stopped. In addition, a recording and reproduction apparatus requires memory for holding the intermediate data necessary in compression and expansion processing. A related technology is disclosed in Japanese Patent Laid-open Publication No. H11-146246, wherein the intermediate data for compression processing and the data to be recorded to the recording medium are both held in one memory.

BRIEF SUMMARY OF THE INVENTION

In the above conventional art, technology wherein one memory holds both the intermediate data for compression processing and the data for recording is disclosed, however the efficient, cost-effective allocation of memory capacity is not provided. In effect, the allocation of a memory of fixed capacity to each of the intermediate data and recording data worsens cost-effectiveness in relation to capacity. The conventional art concerns an electronic still camera, and has the object of not losing a shot, but little consideration is given to memory capacity becoming insufficient and image quality deteriorating.

The present invention provides a recording or reproduction apparatus with superior cost-effectiveness and an efficient configuration of the memory for holding data for recording and reproduction processing. To achieve this functionality, a data recording apparatus according to the present invention comprises: a data compressor which compresses input data; a data recorder which records compressed data to a recording medium; a memory which holds first data which undergoes compression, and second data, which is recorded to the recording medium; and a memory controller which controls the size of the regions in the memory for holding the first data and second data.

To compress input data, the data compressor comprises a standard compression mode for compression processing using a plurality of intermediate data, and a simple compression mode for performing the compression process using part of the intermediate data. The memory controller sets the first data region in memory according to the mode of the data compressor and sets the remaining region of the memory as the second data region. When the data compressor is operating in the standard compression mode and the data recorder becomes unable to record, the data compressor automatically switches to the simple compression mode.

The standard compression mode is a high-image-quality processing mode for performing noise reduction processing or dynamic range expansion processing using the correlation with image data of the consecutive video frames or consecutive video fields, for example. The simple compression mode is a mode which omits the correlation with image data of consecutive video frames or video fields.

A data reproduction apparatus according to a preferred embodiment of the present invention includes: a data reproducer which reproduces compressed data from a recording medium; a data expander which expands reproduced data; memory which holds first data reproduced from the recording medium and second data which undergoes expansion processing; and a memory controller which controls the size of the region in memory for holding the first and second data. Also, in the data recording method relating to the present invention, first data, which undergo compression, and second data, which are recorded to the recording medium, are held in memory, and the sizes of the regions in memory for holding the first and second data are controlled according to the recording data quality level. Alternatively, the sizes of the regions in memory for holding the first and second data are controlled according to whether recording is possible. Furthermore, in the data reproduction method relating to the present invention, first data, which are reproduced from the recording medium, and second data, which undergo expansion, are held in memory, and the sizes of the regions in memory for holding the first and second data are controlled according to the reproduction data quality level. Alternatively, the sizes of the regions in memory for holding the first and second data are controlled according to whether reproduction is possible.

BRIEF DESCRIPTION OF THE DRAWINGS

These and other features and advantages of the present invention will become readily apparent from the following detailed description taken in conjunction with the accompanying drawings, wherein.

DESCRIPTION OF THE PREFERRED EMBODIMENTS

Figure 1:
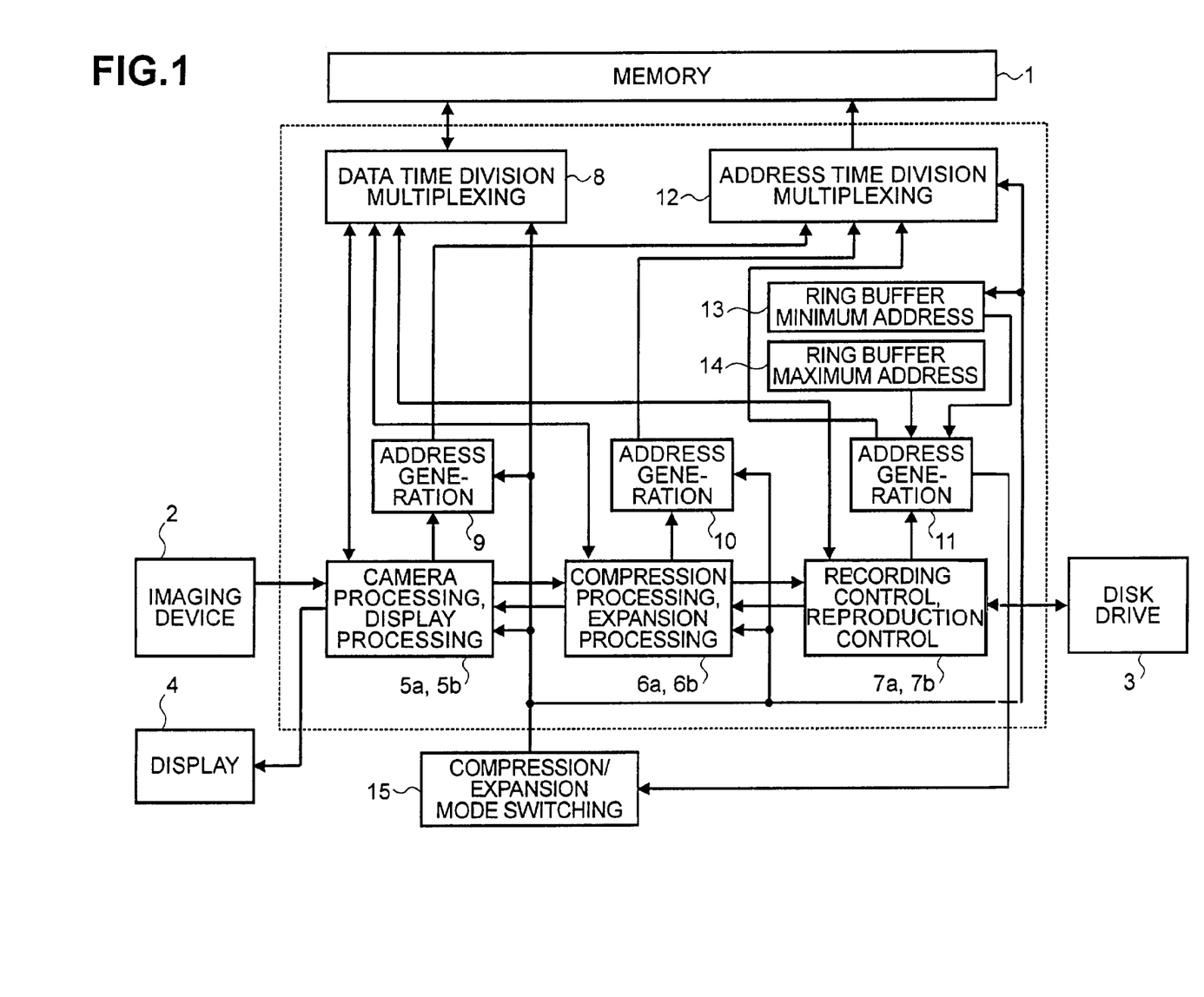
FIG. 1 is a block diagram showing an embodiment of an imaging apparatus according to the present invention.

The preferred embodiments of the present invention are explained below with reference to the drawings. FIG. 1 is a block diagram of an imaging apparatus relating to the present invention. This embodiment shows an apparatus for performing both recording and reproduction. A video signal captured with an imaging device 2 undergoes data compression, is stored in a memory 1 and is recorded on a disk drive 3, or data reproduced from disk drive 3 are expanded after being taken from memory 1 and are displayed on a display 4. Circuit blocks 5 through 14 perform compression and recording, and reproduction and expansion, and can be integrated in a single integrated circuit (LSI).

This circuit includes the following: a camera processing circuit 5a and a display processing circuit 5b, a compression processing circuit 6a, an expansion processing circuit 6b, a recording control circuit 7a, a reproduction control circuit 7b, a data time division multiplexing circuit 8, an address generating circuit 9 for camera processing and display processing, an address generating circuit 10 for compression and expansion processing, an address generating circuit 11 for recording and reproduction control, an address time division multiplexing circuit 12, a ring buffer minimum address setting circuit 13, a ring buffer maximum address setting circuit 14, and a compression and expansion mode switching circuit 15.

The operation of the apparatus shown in FIG. 1 during recording is described next. Camera processing circuit 5a converts the signal output from imaging device 2 to digital picture data. At this time, image preprocessing is carried out, such as frame or field noise reduction processing (FNR) for reducing noise using the correlation of picture data from the preceding frame or the preceding field, or wide dynamic range processing (WDR) for synthesizing captured images with different exposure times and expanding the dynamic range. For this reason, one frame or one field of image data is stored in memory 1 as intermediate data and used in this processing.

Compression processing circuit 6a compresses the image data, for which preprocessing is completed, using an encoding scheme such as MPEG2. In MPEG2, it is necessary to perform a reordering process for the image to undergo bidirectional prediction, and to hold the reference pictures used in prediction]. Image data are held as intermediate data in memory 1 and used for this process.

Recording control circuit 7a temporarily stores compressed data in memory 1 and intermittently reads and sends the data to disk drive 3. The data sent are recorded on the disk which is the recording medium in disk drive 3. When the disk drive 3 cannot record because of factors such as vibrations, the reading and sending of data from memory 1 are stopped.

Figure 2:
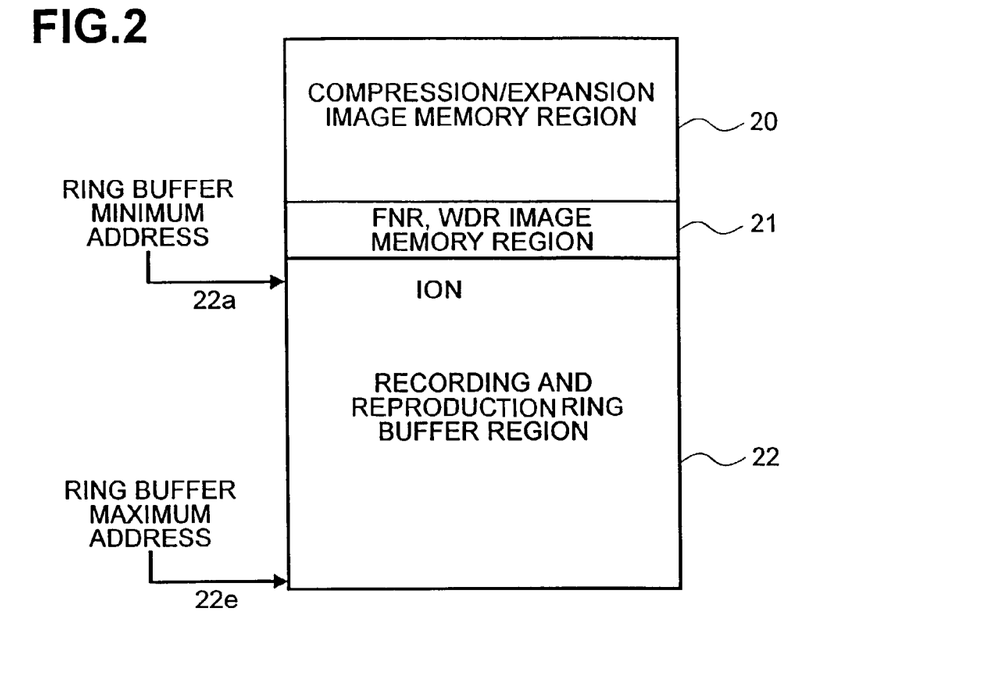
FIG. 2 is an example of an address map (standard compression/expansion mode) in the memory in FIGS. 1, 6, and 7.

FIG. 2 shows an address map in memory 1. Image data read and written by compression processing circuit 6a and expansion processing circuit 6b are stored in compression/expansion image memory region 20. Image data read and written by camera processing circuit 5a and display processing circuit 5b are stored in FNR, WDR image memory region 21. Compressed data read and written by recording control circuit 7a and reproduction control circuit 7b are stored in recording/reproduction ring buffer region 22. Each of the memory regions here is used for both the recording operation and the reproduction operation. Needless to say, however, these regions are used for one operation only in a recording apparatus or reproduction apparatus.

The time division multiplexing circuit 8 shown in FIG. 1 performs time division multiplexing of data read and written by camera processing circuit 5a, compression processing circuit 6a, and recording control circuit 7a; outputs this data to memory 1; and thereby reconciles the reading/writing of each circuit. Address generating circuit 9 generates the address of FNR, WDR image memory region 21; address generating circuit 10 generates the address of compression/expansion image memory region 20; and address generating circuit 11 generates the address of recording/reproduction ring buffer region 22. Address time division multiplexing circuit 12 performs time division multiplexing of these addresses and supplies them to memory 1. Data are thereby read from and written to each region.

Address generating circuit 11 for recording/reproduction control generates an address between the address shown by the ring buffer minimum address setting circuit 13 and the address shown by the ring buffer maximum address setting circuit 14. The address shown by ring buffer minimum address setting circuit 13 is the primary address 22a of the memory region, excluding compression/expansion image memory region 20 and FNR, WDR image memory region 21. The address shown by read buffer maximum address setting circuit 14 matches the address 22e of memory 1.

Figure 3:
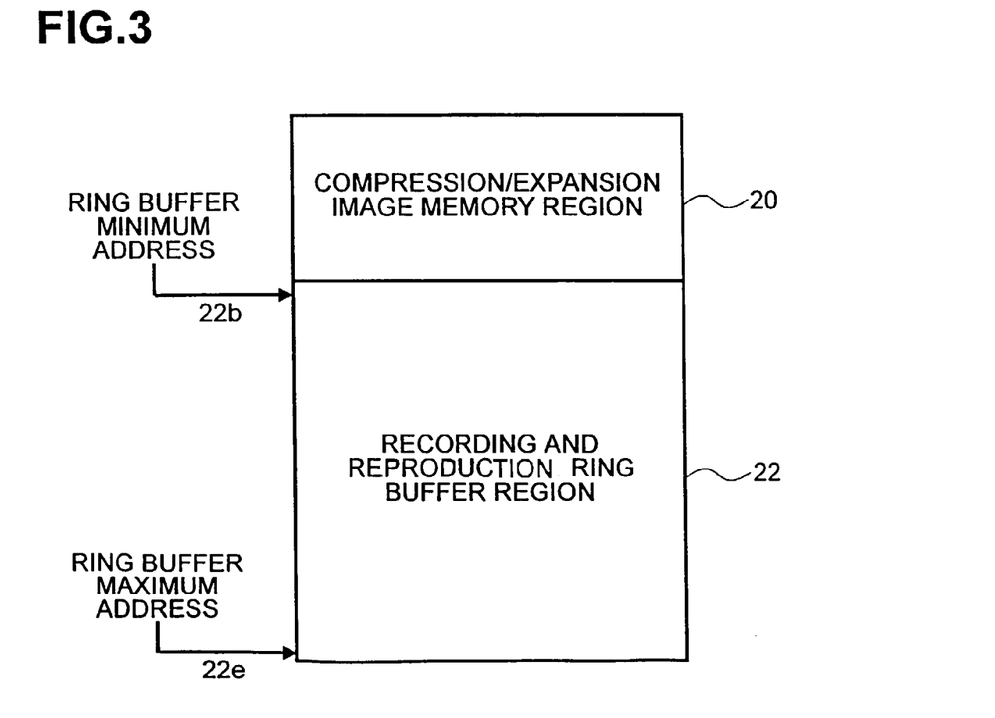
FIG. 3 is an example of an address map (simple compression/expansion mode) in the memory in FIGS. 1, 6, and 7.

The switching of the compression mode is explained next. FIG. 2 is an example of an address map in the standard compression mode and FIG. 3 is an example of the address map in the simple compression mode. In the address map of the simple compression mode in FIG. 3, the FNR, WDR image memory region 21 is eliminated and the recording/reproduction ring buffer region 22 is expanded into that portion.

The switching of the compression mode is carried out according to a command from compression/expansion mode changing circuit 15 shown in FIG. 1. Upon receiving the command to switch to the simple compression mode, camera processing circuit 5a stops image preprocessing, such as noise reduction processing (FNR), or wide dynamic range processing (WDR) to synthesize captured images with different exposure times and expand the dynamic range. Address generating circuit 9 stops address generation for FNR, WDR image memory region 21; data time division multiplexing circuit 8 stops multiplexing data read/written by camera processing circuit 5a; and address time division multiplexing circuit 12 stops multiplexing addresses from address generating circuit 9. Further, upon receiving the command to switch to the simple compression mode, ring buffer minimum address setting circuit 13 switches to show the primary address 22b of the region, excluding compression/expansion image memory region 20. Recording/reproduction ring buffer region 22 is expanded by switching to the simple compression mode. As a result, the memory capacity for temporarily holding recording data can be expanded to maximum size according to the picture quality level of the recording data. Memory can therefore be used efficiently and the situation wherein data quality is sacrificed due to a lack of memory can be avoided.

The automatic switching of the compression mode is explained next. Address generating circuit 11 for recording/reproduction control calculates how much data is currently stored in recording/reproduction ring buffer region 22. If the disk drive remains in a state where recording is not possible for a long period as an effect of vibrations or the like continuing for a long time, the amount of data stored in recording/reproduction ring buffer region 22 increases and the memory region quickly becomes full. When this type of situation arises in the standard compression mode shown in FIG. 2, address generating circuit 11 outputs a command to compression/expansion mode changing circuit 15, which switches from the standard compression mode to the simple compression mode. Accordingly, because recording/reproduction ring buffer region 22 automatically expands in response to the state where recording is impossible due to factors such as vibrations, as shown in FIG. 3, durability (margin) of the recording capacity can be provided. Moreover, if the recording state of disk drive 3 stabilizes and the amount of data stored in recording/reproduction ring buffer region 22 returns to normal, the system may switch to the standard compression mode. Although not shown, a switch to manually choose whether to perform this switching automatically can be provided and the user can employ this as well. Furthermore, a display portion showing whether the current operating mode is the standard mode or simple mode can also be provided.

Figure 4:
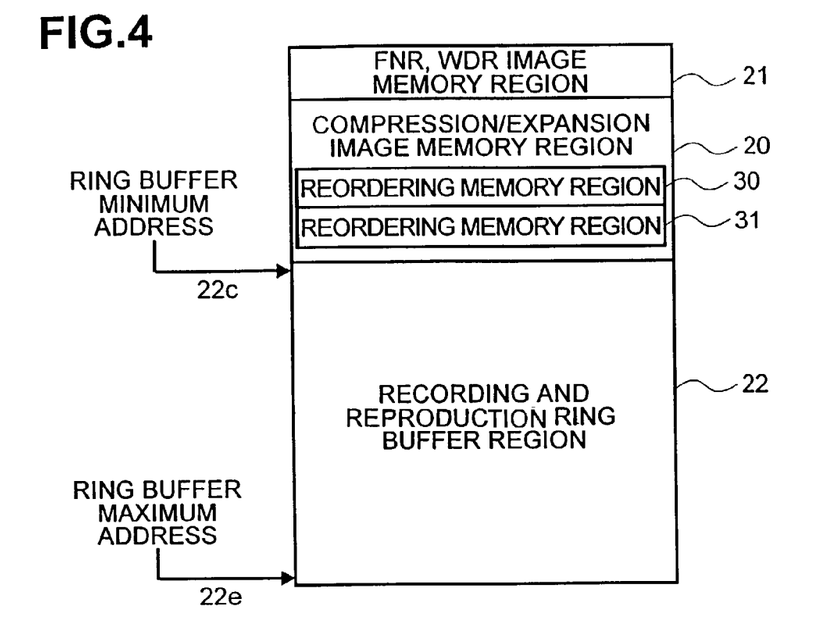
FIG. 4 is another example of an address map (standard compression/expansion mode) in the memory in FIGS. 1, 6, and 7.

Another embodiment of compression mode switching is explained next. FIG. 4 shows the address map of another embodiment of the standard compression mode. The locations of compression/expansion image memory region 20 and FNR, WDR image memory region 21 are repositioned relative to the embodiment in FIG. 2. Image data for sequential reordering of images for bidirectional prediction are stored as intermediate data in compression/expansion image memory region 20. The image data (B picture) which undergo bidirectional prediction must be retained because of being encoded after the future image. Reordering memory regions 30, 31 hold this B picture. In the standard compression mode, the encoding of up to two successive B pictures (maximum interval of I or P picture=3) can be carried out.

Figure 5:
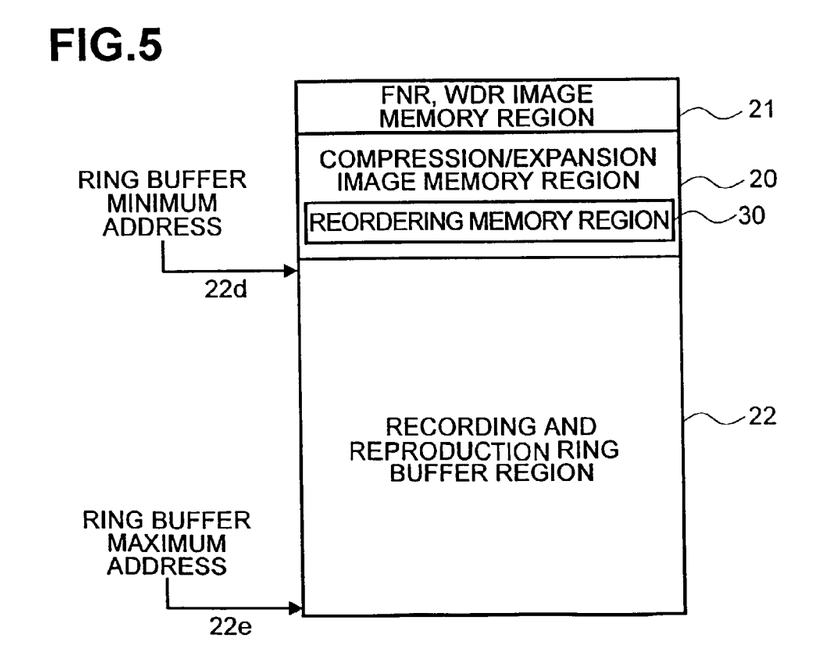
FIG. 5 is another example of an address map (standard compression/expansion mode) in the memory in FIGS. 1, 6, and 7.

Moreover, FIG. 5 shows an address map of the simple compression mode. One reordering memory region 31 is eliminated and recording/reproduction ring buffer memory 22 is expanded by that amount, as exemplified by the change shown from minimum address 22c to 22d. In the simple compression mode, the encoding of up to one successive B picture (maximum interval of I or P picture=2) is carried out.

By switching between the states in FIG. 4 and FIG. 5, it becomes possible to use memory effectively according to the quality of the compressed images. In this case, as well, if recording/reproduction ring buffer region 22 becomes full because of the effects of vibrations or the like, durability can be improved by automatically switching from the standard compression mode to the simple compression mode.

The operation of the apparatus shown in FIG. 1 during reproduction is explained next. Reproduction control circuit 7b exerts control to read data intermittently from disk drive 3. Reproduction control circuit 7b temporarily stores reproduction data received from disk drive 3 in memory 1 and sends the data to expansion processing circuit 6b. When disk drive 3 is unable to reproduce data because of the influence of vibrations or the like, the supply of data from disk drive 3 stops. Expansion processing circuit 6b expands data supplied from reproduction control circuit 7b. When expanding data compressed with MPEG2, it is necessary to retain reference pictures used in prediction, and image data are stored in memory 1 and used for this processing.

Display processing circuit 5b converts expanded image data to a video signal in a format corresponding to display 4. At this time, image post-processing such as noise reduction using the correlation with the image data from the preceding frame or the preceding field is carried out. Image data of one frame or one field is stored in memory 1 and used for this purpose. Display 4 displays the video signal after image processing.

The address map in memory 1 is now as shown in FIG. 2 in the standard expansion mode, during recording. The functions of the following elements are analogous to their roles during recording: data time division multiplexing circuit 8 and address generating circuit 9 for display processing, address generating circuit 10 for compression/expansion processing, address generating circuit 11 for recording/reproduction control, address time division multiplexing circuit 12, ring buffer minimum address setting circuit 13, and the ring buffer maximum address setting circuit 14.

Expansion mode switching is explained next. The address map for the simple expansion mode is as shown in FIG. 3, as it is during recording. This switching of the expansion mode is carried out on command from compression/expansion mode changing circuit 15. Display processing circuit 5b, which received the command, stops image post-processing, such as noise reduction processing. Address generating circuit 9 stops address generation for the FNR, WDR image memory region 21; data time division multiplexing circuit 8 stops multiplexing data read/written by the camera processing and display processing circuit 5; and address time division multiplexing circuit 12 stops multiplexing addresses from address generating circuit 9. Ring buffer minimum address setting circuit 13, which received the command, changes to show the primary address 22b of the region, excluding compression/expansion image memory region 20.

As a result, the memory capacity for temporarily holding reproduction data can be expanded to the maximum size according to the picture quality level of the reproduction data. Memory can therefore be used efficiently and the situation wherein data quality is sacrificed due to a lack of memory can be avoided.

The automatic switching of the expansion mode is explained next. Address generating circuit 11 for recording/reproduction control calculates how much data is currently stored in recording/reproduction ring buffer region 22. When disk drive 3 remains in a state where reproduction is not possible for a long period as an effect of vibrations or the like continuing for a long time, the amount of data stored in recording/reproduction ring buffer region 22 decreases and the memory region is quickly emptied. When this type of situation arises in the standard expansion mode shown in FIG. 2, compression/expansion mode changing circuit 15 changes from the standard expansion mode to the simple expansion mode upon a command from address generating circuit 11. Accordingly, because recording/reproduction ring buffer region 22 expands as shown in FIG. 3, durability (margin) of recording capacity can be provided in response to a situation where reproduction is not possible because of vibrations or the like. Moreover, if the reproduction state of disk drive 3 stabilizes and the amount of data stored in the recording/reproduction ring buffer region 22 returns to normal, the system may switch to the standard expansion mode. Moreover, a switch to manually choose whether to perform this switching automatically can be provided and the user can employ this as well. Furthermore, a display portion showing whether the current operating mode is the standard mode or simple mode can also be provided. An anomaly in the reproduction state can be identified by looking at the data occupancy in recording/reproduction ring buffer region 22, or by looking at how often data are not returned from disk drive 3 because reproduction is impossible.

Figure 6:
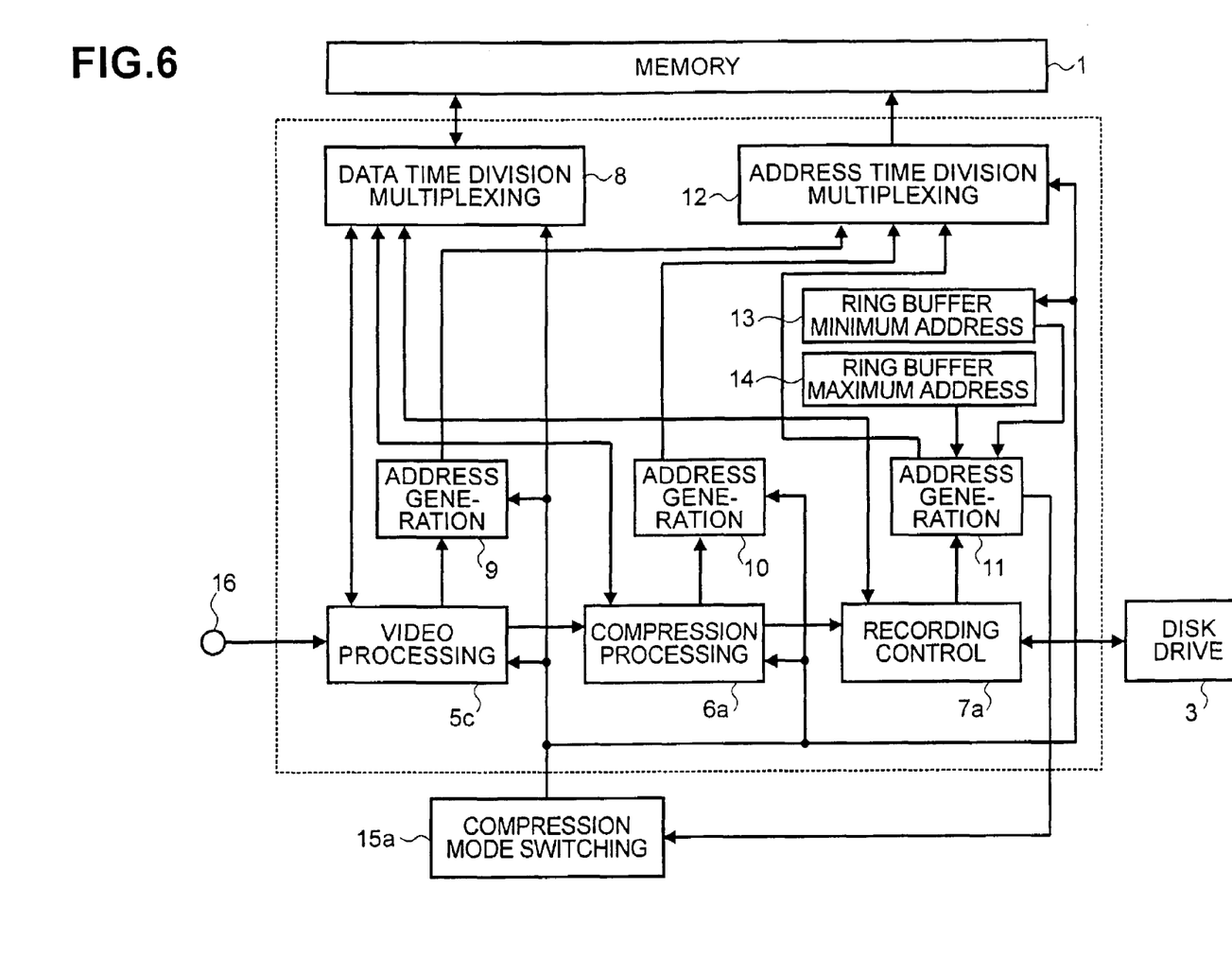
FIG. 6 is a block diagram showing an embodiment of the recording apparatus relating to the present invention.

FIG. 6 is a block diagram of a data recording apparatus according to the present invention. A video signal inputted from a video data input terminal 16 undergoes data compression using memory 1 and is recorded on disk drive 3. Circuit blocks 5 through 14 perform compression and recording and can be implemented as a single LSI.

This circuit includes the following: video preprocessing circuit 5c, compression processing circuit 6a, recording control circuit 7a, data time division multiplexing circuit 8, address generating circuit 9 for video preprocessing, address generating circuit 10 for compression processing, address generating circuit 11 for recording control, address time division multiplexing circuit 12, ring buffer minimum address setting circuit 13, ring buffer maximum address setting circuit 14, and compression mode changing circuit 15a.

The operation of the apparatus shown in FIG. 6 is explained. Video preprocessing circuit 5c converts the signal input from video data input terminal 16 to digital picture data. At this time, image preprocessing is carried out, such as frame or field noise reduction processing (FNR) using the correlation of picture data from the previous frame or the previous field. For this reason, one frame or one field of image data is stored in the memory 1 as intermediate data and used in this processing.

Compression processing circuit 6a compresses the image data, for which preprocessing is completed, using an encoding scheme such as MPEG2. In MPEG2, it is necessary to perform a reordering process for the image (picture) to undergo bidirectional prediction, and to hold reference pictures used in prediction. Image data are held as intermediate data in memory 1 and used for this reordering process.

Recording control circuit 7a temporarily stores compressed data in memory 1 and intermittently reads and sends the data to disk drive 3. The data sent are recorded to the disk which is the recording medium in disk drive 3. When disk drive 3 cannot record because of factors such as vibrations, the reading and sending of data from memory 1 are stopped.

The address map in memory 1 has the space allocation shown in FIG. 2 in the standard compression mode for the recording/reproduction apparatus of FIG. 1. Image data read and written by compression processing circuit 6a are stored in compression image memory region 20. Image data read and written by video preprocessing circuit 5c are stored in FNR image memory region 21. Compressed data read and written by recording control circuit 7a are stored in recording ring buffer region 22.

The time division multiplexing circuit 8 shown in FIG. 6 performs time division multiplexing of data read and written by video preprocessing circuit 5c, compression processing circuit 6a, and recording control circuit 7a; outputs this data to memory 1; and thereby reconciles the reading/writing of each circuit. Address generating circuit 9 generates the address of FNR image memory region 21; address generating circuit 10 generates the address of compression image memory region 20; and address generating circuit 11 generates the address of recording ring buffer region 22. Address time division multiplexing circuit 12 performs time division multiplexing of these addresses and supplies them to memory 1. Data are thereby read from and written to each region.

Address generating circuit 11 for recording control generates an address between the address shown by ring buffer minimum address setting circuit 13 and the address shown by ring buffer maximum address setting circuit 14. The address shown by ring buffer minimum address setting circuit 13 is the primary address 22a of the region, excluding compression image memory region 20 and the FNR image memory region 21. The address shown by read buffer maximum address setting circuit 14 matches the address 22e of memory 1.

Compression mode switching is explained next. The address map in memory 1 is as shown in FIG. 3 in the simple compression mode, as for the recording/reproduction apparatus shown in FIG. 1. In FIG. 3, FNR image memory region 21 is eliminated and recording ring buffer region 22 is expanded into that portion.

The switching of the compression mode is carried out according to a command from compression mode changing circuit 15a shown in FIG. 6. Upon receiving the command to switch to the simple compression mode, video preprocessing circuit 5c stops image preprocessing, such as noise reduction processing (FNR). Address generating circuit 9 stops address generation for FNR image memory region 21; data time division multiplexing circuit 8 stops multiplexing data read/written by video preprocessing circuit 5c; and address time division multiplexing circuit 12 stops multiplexing addresses from address generating circuit 9. Moreover, upon receiving the command to switch to the simple compression mode, ring buffer minimum address setting circuit 13 switches to show the primary address 22b of the region, excluding the compression image memory region 20. Recording ring buffer region 22 is expanded by switching to the simple compression mode.

As a result, the memory capacity for temporarily holding recording data can be expanded to the maximum level according to the quality level (picture quality) of the recording data. Memory can therefore be used efficiently and the situation wherein data quality is sacrificed due to a lack of memory can be avoided.

The automatic switching of the compression mode is explained next. Address generating circuit 11 for recording control calculates how much data is currently stored in recording ring buffer region 22. When the disk drive remains in a state where recording is not possible for a long period as an effect of vibrations or the like continuing for a long time, the amount of data stored in recording ring buffer region 22 increases and the memory region quickly becomes full. When this type of situation arises in the standard compression mode shown in FIG. 2, address generating circuit 11 outputs a command to compression mode changing circuit 15a, and compression mode changing circuit 15a changes from the standard compression mode to the simple compression mode. Accordingly, because recording ring buffer region 22 automatically expands, as shown in FIG. 3, in response to the state where recording is impossible due to factors such as vibrations, durability (margin) of the recording capacity can be provided. Moreover, if the recording state of disk drive 3 stabilizes and the amount of data stored in recording ring buffer region 22 returns to normal, this system may switch to the standard compression mode.

Although not shown, a switch to manually choose whether to perform this switching automatically can be provided and the user can employ this as well. Furthermore, a display portion showing whether the current operating mode is the standard mode or simple mode also can be provided.

Another embodiment for compression mode switching is explained next. FIG. 4 shows the address map of another embodiment of the standard compression mode, like the recording/reproduction apparatus as shown in FIG. 1. The locations of the compression image memory region 20 and the FNR image memory region 21 are reordered relative to the embodiment in FIG. 2. Image data for sequential reordering of images for bidirectional prediction are stored as intermediate data in the compression image memory region 20. The image data (B picture) which undergo bidirectional prediction must be retained because of being encoded after the future image. The reordering memory regions 30, 31 are regions for holding this B picture. In the standard compression mode, the encoding of up to two successive B pictures (maximum interval of I or P picture=3) can be carried out thereby.

Meanwhile, FIG. 5 shows an address map of the simple compression mode, like the recording/reproduction apparatus as shown in FIG. 1. One reordering memory region 31 is eliminated and the recording ring buffer memory 22 is expanded by that amount from the minimum address 22c to 22d. In the simple compression mode, the encoding of up to one successive B picture (maximum interval of I or P picture=2) is carried out thereby.

By switching between the states in FIG. 4 and FIG. 5, it becomes possible to use memory effectively according to the quality of the compressed images. In this case as well, if the recording ring buffer region 22 becomes full because of the effects of vibrations or the like, durability can be improved by automatically switching from the standard compression mode to the simple compression mode.

Figure 7:
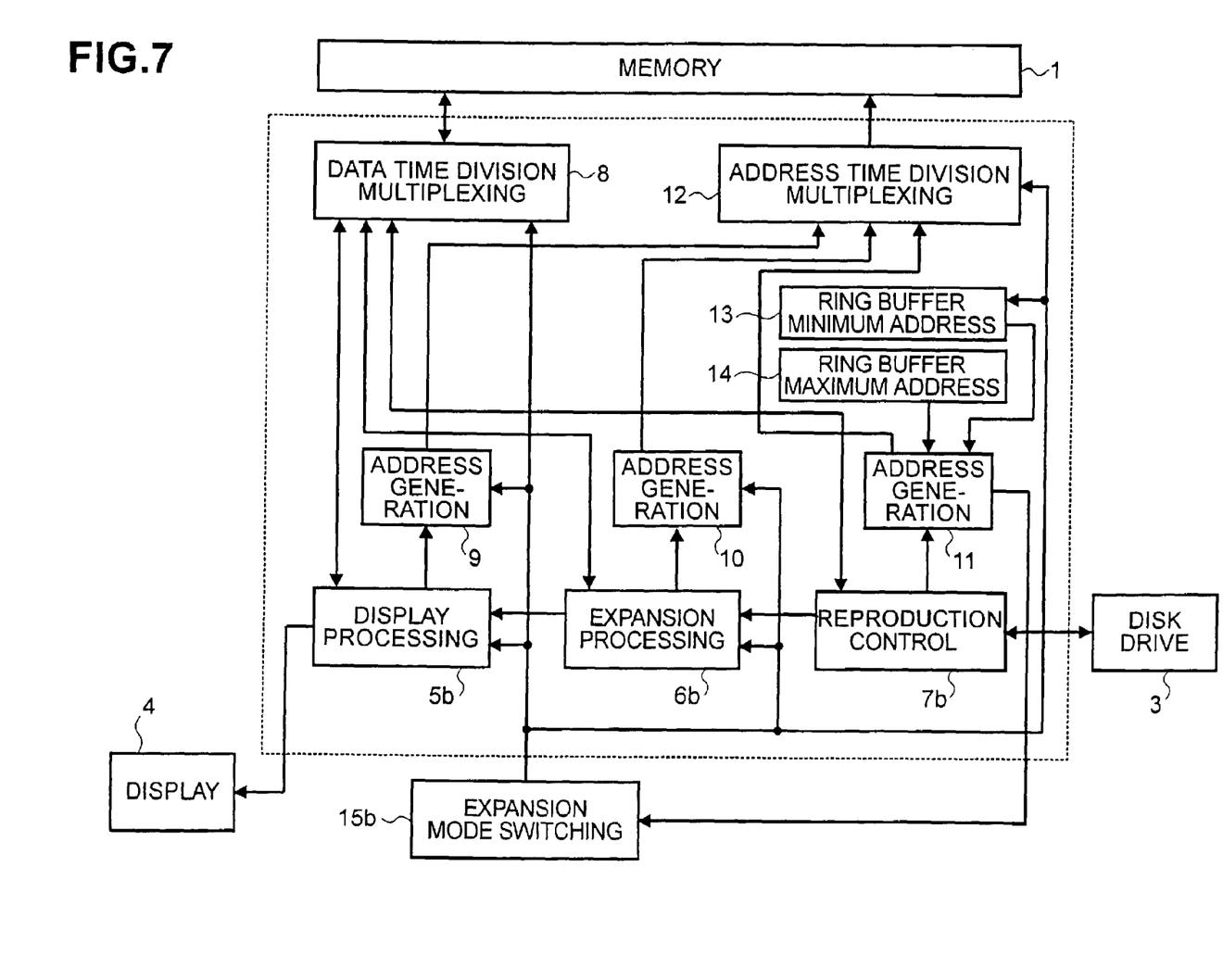
FIG. 7 is a block diagram showing an embodiment of the reproduction apparatus according to the present invention.

FIG. 7 is a block diagram of a data reproduction apparatus according to the present invention. Data reproduced from disk drive 3 are expanded using memory 1 and are displayed on display 4. Circuit blocks 5 through 14 perform reproduction and expansion.

This circuit includes the following: display processing circuit 5b, expansion processing circuit 6b, reproduction control circuit 7b, data time division multiplexing circuit 8, address generating circuit 9 for display processing, address generating circuit 10 for expansion processing, address generating circuit 11 for reproduction control, address time division multiplexing circuit 12, ring buffer minimum address setting circuit 13, ring buffer maximum address setting circuit 14, and expansion mode changing circuit 15b.

The operation of the apparatus shown in FIG. 7 is explained next. The reproduction control circuit 7b exerts control to read data intermittently from disk drive 3. Reproduction control circuit 7b temporarily stores reproduction data received from disk drive 3 to memory 1 and sends the data to expansion processing circuit 6b. When disk drive 3 is unable to reproduce data because of the influence of vibrations or the like, the supply of data from disk drive 3 stops. Expansion processing circuit 6b expands data supplied from reproduction control circuit 7b. In the case of expanding data compressed with MPEG2, it is necessary to retain reference pictures used in prediction, and image data are stored in memory 1 and used for this processing.

Display processing circuit 5b converts expanded image data to a video signal in a format corresponding to display 4. At this time, image post-processing such as noise reduction, using the correlation with the image data from the previous frame or the previous field, is carried out. Image data of one frame or one field is stored in memory 1 and used for this purpose. Display 4 displays the video signal after image processing.

The address map in memory 1 has the space allocation shown in FIG. 2 in the standard expansion mode for the recording/reproduction apparatus shown in FIG. 1. The functions of the following elements are analogous to their in relation to the recording/reproduction apparatus: data time division multiplexing circuit 8, address generating circuit 9 for display processing, address generating circuit 10 for expansion processing, address generating circuit 11 for reproduction control, address time division multiplexing circuit 12, ring buffer minimum address setting circuit 13, and ring buffer maximum address setting circuit 14.

Expansion mode switching is explained next. The address map for the simple expansion mode is as shown in FIG. 3, as for the recording/reproduction apparatus as shown in FIG. 1. This switching of the expansion mode is carried out on command from expansion mode changing circuit 15b. Display processing circuit 5b, which received the command, stops image post-processing, such as noise reduction. Address generating circuit 9 stops address generation for FNR image memory region 21; data time division multiplexing circuit 8 stops multiplexing data read/written by display processing circuit 5b; and address time division multiplexing circuit 12 stops multiplexing addresses from address generating circuit 9. Ring buffer minimum address setting circuit 13, which received the command, changes to show the primary address 22b of the region, excluding the expansion image memory region 20.

As a result, the memory capacity for temporarily holding reproduction data can be expanded to the maximum level according to the quality level (picture quality) of the reproduction data. Memory can therefore be used efficiently and the situation wherein data quality is sacrificed due to a lack of memory can be avoided.

The automatic switching of the expansion mode is explained next. Address generating circuit 11 for reproduction control calculates how much data is currently stored in reproduction ring buffer region 22. When disk drive 3 remains in a state where reproduction is not possible for a long period as an effect of vibrations or the like continuing for a long time, the amount of data stored in reproduction ring buffer region 22 decreases and the memory region is quickly emptied. When this type of situation arises in the standard expansion mode shown in FIG. 2, expansion mode changing circuit 15b changes from the standard expansion mode to the simple expansion mode upon a command from address generating circuit 11. Accordingly, because reproduction ring buffer region 22 expands, as shown in FIG. 3, durability (margin) of the recording capacity can be provided in response to a situation where reproduction is not possible because of vibrations or the like. Moreover, if the reproduction state of disk drive 3 stabilizes and the amount of data stored in reproduction ring buffer region 22 returns to normal, the system may switch to the standard expansion mode.

In addition, a switch to manually chose whether to perform this switching automatically can be provided and the user can employ this as well. Furthermore, a display portion showing whether the current operating mode is the standard mode or simple mode can also be provided. An anomaly in the reproduction state can be identified by looking at the data occupancy in reproduction ring buffer region 22, or by looking at how often data are not returned from disk drive 3 because of reproduction is impossible.

In the embodiments discussed above, audio signals were not described. The compression of audio data, however, and the multiplexing of compressed image data and compressed audio data are performed by compression/expansion processing circuit 6a, 6b, and the multiplexed data are stored in recording /reproduction ring buffer region 22. As a result, images with sound can be recorded in exactly the same way as images without sound. During reproduction, the multiplexed data are stored in recording/reproduction ring buffer region 22 and the separation of compressed image data and compressed audio data, and the expansion of audio data are carried out in compression/expansion processing circuit 6a, 6b. As a result, images with sound can be reproduced. In the above-mentioned embodiments, memory 1 for storing compressed (or expanded) data and recording (or reproduction) data is a single shared memory, but the present invention can also apply when there are multiple memories. Furthermore, the present invention can also be applied to an imaging apparatus containing an imaging device or display, as well as to a recording or reproduction apparatus.

With the present invention, it becomes possible to provide a recording or reproduction apparatus with superior cost-effectiveness and an efficient configuration of the regions in memory for storing data for recording/reproduction processing.

The invention may be embodied in other specific forms without departing from the spirit or essential characteristics thereof. The present embodiment is therefore to be considered in all respects as illustrative and not restrictive, the scope of the invention being defined by the appended claims rather than by the foregoing description and the range of equivalency of the claims are therefore intended to be included in that delineation.

What is claimed is:

1. A data recording apparatus, for recording input data to a recording medium after compressing, comprising:
   a data compressor which compresses said input data into compressed data;
   a data recorder which records the compressed data to said recording medium intermittently;
   a single memory having both a first data region which temporarily stores first data usable in a compression process and a second data region which temporarily stores second data to be recorded to said recording medium, wherein the second data is the compressed data;
   a memory controller which allocates portions of the single memory for the first and second data regions, wherein the sizes of both the first and second data regions are adaptable such that when one of the first data region or the second data region decreases in size, the other data region increases in size;
   wherein the data recorder intermittently reads the compressed data from the second data region for recording the compressed data to said recording medium intermittently;
   wherein said data compressor includes a standard compression mode for performing the compression process using a plurality of intermediate data to compress input data, and a simple compression mode for performing the compression process using part of the plurality of intermediate data; and
   in the case where said data compressor is operating in said standard compression mode and recording of the compressed data to said recording medium is impossible, the mode of said data compressor is switched to said simple compression mode, the first data region decreases in size, and the second data region increases in size.

2. The data recording apparatus, according to claim 1, wherein the mode of said data and compressor is switched to said simple compression mode when said data compressor is operating in said standard compression mode and said second data region in said single memory becomes full of data.

3. The data recording apparatus, according to claim 1, wherein, in the case where that data recording apparatus receives vibrations greater than or equal to a prescribed amount, the mode of said data compressor is switched to said simple compression mode and said data recorder stops recording or records intermittently.

4. The data recording apparatus, according to claim 1, wherein said input data is image data;
   said intermediate data includes third data to undergo high image quality processing before input data are compressed;
   said standard compression mode is a mode for performing high image quality processing using said third data;
   and said simple compression mode is a mode for performing processing without said third data.

5. The data recording apparatus, according to claim 4, wherein noise reduction processing or dynamic range expansion processing, using the correlation with image data of the consecutive video frames or consecutive video fields, are performed as said high image quality processing.

6. The data recording apparatus, according to claim 1, wherein said data compressor compresses input image data using bidirectional prediction;
   said intermediate data includes fourth data comprising a prescribed number of frames of picture data stored for sequential reordering of images during compression using bidirectional prediction;
   said standard compression mode is a mode for compressing using all of said fourth data; and said simple compression mode is a mode for compressing using part of said fourth data.

7. The data recording apparatus, according to claim 1, further comprising:
   a data compressor which compresses said data in different compression modes that can be switched; and
   a data recorder which records compressed data to said recording medium;
   wherein said data recorder records in a simple compression mode, where high quality processing is not performed when the data recording apparatus receives vibrations greater than or equal to a prescribed amount.

8. The data recording apparatus, according to claim 1, wherein the memory controller is configured to allocate different portions of the single memory for the first and second regions based at least in part on the input data comprising at least one of moving pictures, and still pictures.

9. A data reproducing apparatus, for reproducing compressed data from a recording medium and expanding same, comprising:
   a data compressor which compresses input data into compressed data;
   a data reproducer which reproduces said compressed data from said data compressor intermittently;
   a data expander which expands said compressed data;
   a single memory having both a first data region which temporarily stores first data reproduced from said recording medium and a second data region which temporarily stores second data usable in an expansion process, wherein the first data is the compressed data;
   a memory controller which allocates portions of the single memory for the first and second data regions, wherein the sizes of both the first and second data regions are adaptable such that when one of the first data region or the second data region decreases in size, the other data region increases in size;

wherein the data recorder intermittently reads the compressed data from the second data region for recording the compressed data to said recording medium intermittently;

wherein said data compressor includes a standard compression mode for performing the compression process using a plurality of intermediate data to compress input data, and a simple compression mode for performing the compression process using part of the plurality of intermediate data; and in the case where said data compressor is operating in said standard compression mode and recording of the compressed data to said recording medium is impossible, the mode of said data compressor is switched to said simple compression mode, the first data region decreases in size, and the second data region increases in size.

10. The data reproducing apparatus, according to claim 9, wherein said data expander has a standard expansion mode for expansion processing using a plurality of intermediate data for expansion processing of reproduced data, and a simple expansion mode for performing expansion processing using part of the intermediate data; and wherein said memory controller sets said second data region in said single memory according to the mode of said data expander, and sets the remaining region in said single memory as said first data region.

11. The data reproducing apparatus, according to claim 10, wherein the mode of said data expander is switched to said simple expansion mode when said data expander is operating in said standard expansion mode and said data reproducer becomes unable to reproduce.

12. The data reproducing apparatus, according to claim 10, wherein the mode of said data expander is switched to said simple expansion mode when said data expander is operating in said standard expansion mode and said first data region in said single memory becomes emptied of data.

13. The data reproducing apparatus, according to claim 10, wherein, in the case where that data reproducing apparatus receives vibrations greater than or equal to a prescribed amount, the mode of said data expander is switched to said simple expansion mode, and said data reproducer stops reproducing or reproduces intermittently.

14. The data reproducing apparatus, according to claim 10, wherein said reproduced data is image data;

said intermediate data includes third data to undergo high image quality processing before reproduced data are expanded;

said standard expansion mode is a mode for performing high image quality processing using said third data; and said simple expansion mode is a mode for performing processing without using said third data.

15. The data reproducing apparatus, according to claim 14, wherein noise reduction processing, using the correlation with image data of the consecutive video frames or consecutive video fields, is performed as said high image quality processing.

16. The data reproducing apparatus, according to claim 9, further comprising:

a data reproducer which reproduces compressed data from said recording medium; and a data expander which expands said reproduced data, the expander capable of expanding data in a plurality of expansion modes;

wherein said data reproducer reproduces in a simple expansion mode without performing high quality processing when the data reproducing apparatus receives vibrations greater than or equal to a prescribed amount.

17. A data recording method, for compressing data input using a single memory and recording data to a recording medium, comprising the steps of:

compressing input data using a standard compression mode for performing the compression process using a plurality of intermediate data to compress input data, or a simple compression mode for performing the compression process using part of the plurality of intermediate data, wherein in the case of using said standard compression mode and recording of the compressed data to a recording medium is impossible, the mode of said data compressor is switched to said simple compression mode;

temporarily storing first data which undergo compression processing into a first region of said single memory, and second data which are recorded to said recording medium into a second region of said single memory;

controlling the size of regions in said single memory which stores said first data and said second data according to a recording data quality level such that when one of the first region or the second region decreases in size, the other region increases in size, wherein in the case where recording of the data recorder is impossible, the first data region decreases in size and the second data region increases in size; and intermittently reading the compressed data from the second data region for recording the compressed data to said recording medium.

18. A data recording method, for compressing data input using a single memory and recording data to a recording medium, comprising the steps of:

compressing input data using a standard compression mode for performing the compression process using a plurality of intermediate data to compress input data, or a simple compression mode for performing the compression process using part of the plurality of intermediate data, wherein in the case of using said standard compression mode and recording of the compressed data to a recording medium is impossible, the mode of said data compressor is switched to said simple compression mode;

temporarily storing first data which undergo compression processing into a first region of said single memory, and second data which are recorded to said recording medium to a second region of said single memory;

controlling the size of regions in said single memory which stores both said first data and said second data according to whether recording is possible such that when one of the first region or the second region decreases in size, the other region increases in size, wherein in the case where recording of the data recorder is impossible, the first data region decreases in size and the second data region increases in size; and intermittently reading the compressed data from the second data region for recording the compressed data to said recording medium.

19. A data reproducing method, for expanding data reproduced from a recording medium using a single memory, comprising the steps of:

compressing input data using a standard compression mode for performing the compression process using a plurality of intermediate data to compress input data, or a simple compression mode for performing the compression process using part of the plurality of intermediate data, wherein in the case of using said standard compression mode and recording of the compressed data to a recording medium is impossible, the mode of said data compressor is switched to said simple compression mode;

temporarily storing first data reproduced from said recording medium into a first region of said single memory, and second data which undergo expansion processing into a second region of said single memory;

controlling the size of regions in said single memory which stores both said first data and said second data according to a reproducing data quality level such that when one of the first region or the second region decreases in size, the other region increases in size, wherein in the case where recording of the data recorder is impossible, the first data region decreases in size and the second data region increases in size; and intermittently reading the compressed data from the second data region for recording the compressed data to said recording medium.

20. A data reproducing method, for expanding data reproduced from a recording medium using a single memory, comprising the steps of:

compressing input data using a standard compression mode for performing the compression process using a plurality of intermediate data to compress input data, or a simple compression mode for performing the compression process using part of the plurality of intermediate data, wherein in the case of using said standard compression mode and recording of the compressed data to a recording medium is impossible, the mode of said data compressor is switched to said simple compression mode;

temporarily storing first data reproduced from said recording medium into a first region of said single memory, and second data which undergo expansion processing into a second region of said single memory;

controlling the size of regions in said single memory which stores both said first data and said second data according to whether reproduction is possible such that when one of the first region or the second region decreases in size, the other region increases in size, wherein in the case where recording of the data recorder is impossible, the first data region decreases in size and the second data region increases in size; and intermittently reading the compressed data from the second data region for recording the compressed data to said recording medium.

* * * * *